United States Patent [19]
Gordon

[11] 3,812,212
[45] May 21, 1974

[54] PROCESS FOR INCREASING SELECTIVITY TO 1-BROMOALKANE IN THE ADDITION OF HYDROGEN BROMIDE TO OLEFINS
[75] Inventor: Ronnie D. Gordon, Richardson, Tex.
[73] Assignee: Continental Oil Company, Ponca City, Okla.
[22] Filed: June 21, 1972
[21] Appl. No.: 265,075

[52] U.S. Cl. .............................. 260/663, 204/163
[51] Int. Cl. ........................................... C07c 17/08
[58] Field of Search .................................. 260/663

[56] References Cited
UNITED STATES PATENTS
2,307,552  1/1943  Vaughn et al. ..................... 260/663
3,336,403  8/1967  Kessler ............................. 260/663

Primary Examiner—Leon Zitver
Assistant Examiner—James H. Reamer
Attorney, Agent, or Firm—Ronald J. Carlson

[57] ABSTRACT

1-Bromoalkanes may be produced with improved selectivity by reacting anhydrous hydrogen bromide and a 1-olefin in the presence of a free radical initiator and an organic quaternary salt.

5 Claims, No Drawings

PROCESS FOR INCREASING SELECTIVITY TO 1-BROMOALKANE IN THE ADDITION OF HYDROGEN BROMIDE TO OLEFINS

This invention relates to the free radical addition of hydrogen bromide to olefins to form bromoalkanes. More particularly, this invention relates to an improvement in such free radical addition reactions wherein the selectivity in producing 1-bromoalkanes is increased.

Bromoalkanes, including 1-bromoalkanes, are useful intermediates in producing a great number of organic compounds. For example, 1-bromoalkanes can be reacted with alkali metal cyanide to form nitriles which can be hydrolyzed to mono-acids which in turn can be neutralized with caustic to form salts which are useful as water-soluble and oil-soluble soaps. In addition, various amine oxides useful as detergent compounds may be prepared by oxidizing the reaction product formed by reacting 1-bromoalkanes with a secondary amine. It is further possible to react 1-bromoalkanes with metallic tin followed by treatment with a base to form compounds useful as stabilizers for polyvinyl chloride.

Free radical addition of hydrogen bromide to olefins is well-known in the art. For example, see U.S. Pat. No. 2,058,465; U.S. Pat. No. 2,058,466; U.S. Pat. No. 2,307,552; U.S. Pat. No. 3,255,265; U.S. Pat. No. 3,336,403; and U.S. Pat. No. 3,396,204. In these reactions, hydrogen bromide is reacted with 1-olefins in the presence of free radical initiators such as peroxides, oxygen, ultraviolet light, irradiation and the like. While the free radical initiated reactions are generally regarded in the art as techniques for producing 1-bromoalkanes, or anti-Markownikoff addition, it is also recognized that the reaction invariably produces isomeric forms of bromoalkanes as indicated in U.S. Pat. No. 3,396,204.

In accordance with this invention, it has unexpectedly been found that the selectivity in producing 1-bromoalkanes by free radical addition of hydrogen bromide to 1-olefins may be substantially increased by carrying out the reaction in the presence of an organic quaternary salt.

The free radical addition reaction to which the invention applies are those involving hydrogen bromide and 1-olefins containing from about 3 up to about 40 carbon atoms. Illustrative of the 1-olefins which may be used include propylene, butene-1, 4-methyl-pentene-1, hexene-1, decene-1, tetradecene-1, heptadecene-1, docosene-1, hexaicosene-1, and the like. Most preferably, the 1-olefins contain about 6 to about 18 carbon atoms. Oftentimes the above-described 1-olefins are available as mixtures and it should be understood that the invention applies equally to the use of mixtures of 1-olefins as well as pure 1-olefins.

Free radical initiators are well-known in the art, and the selection of any specific one for use in the process does not constitute an essential feature of the invention. Thus, a great variety of free radical initiators may be employed such as organic and inorganic peroxides, e.g., hydrogen peroxide, acetyl peroxide, benzoyl peroxide, potassium persulfate and the like, azo compounds, e.g., $\alpha, \alpha'$-azodiisobutyronitrile, ultraviolet light, or irradiation. Suitable free radical initiators are described in "Preparative Methods of Polymer Chemistry," Sorenson and Campbell, 1961, pp 158–159 and in numerous other literature sources. The amount of initiator used in the reaction should be an initiating amount, usually at least about 0.001 weight percent based on the 1-olefin. Amounts above this figure may also be employed; however, no significant benefits are derived by employing amounts which are much in excess of about 5 weight percent.

The organic quaternary salts used in the reaction in accordance with this invention to achieve the desired selectivity in producing 1-bromoalkanes may be defined by the formula $(R_1R_2R_3R_4M)^+X^-$ wherein M is a pentavalent ion of nitrogen, arsenic or phosphorus; X is a halide ion, e.g., chloride, iodide or bromide; and $R_1$, $R_2$, $R_3$ and $R_4$ are monovalent hydrocarbon radicals having a total sum of about 12 to about 70 carbon atoms provided that one of the hydrocarbon radicals may be substituted by a further quaternary group so that the salt may be represented as

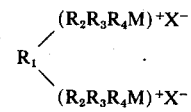

The number of carbon atoms in each hydrocarbon substituent may vary considerably so as to contain from about 1 to more than 25 with the total sum for all hydrocarbon substituents being equal to at least 1 to provide solubility for the salt in the organic reaction mixture. The upper limit of 70 carbon atoms merely constitutes a practical consideration since, theoretically, no upper limit should exist. Preferably, the total sum of carbon atoms for the hydrocarbon substituents is 18 to 40. Thus, the hydrocarbon substituents may be straight or branched chain alkyl or alkenyl groups, aryl groups, alkaryl groups, aralkyl groups or cycloalkyl groups. Generally, the aryl moieties will be phenyl or phenyl having one side ring.

Examples of suitable quaternary salts as defined above are hexadecyltrihexylammonium bromide; trioctylethylammonium bromide; tris(decyl)methylammonium chloride; didocecyldimethylammonium chloride; tetraheptylammonium iodide; dioctadecyldimethylammonium chloride; tris(decyl)methylammonium chloride, tributyldecylphosphonium iodide; triphenyldecylphosphonium iodide; tributylhexadecylphosphonium iodide; tricaprylylmethylammonium chloride; hexadecyltributylphosphonium bromide; tributyloctadecylphosphonium bromide; tribenzyldecylarsonium chloride; N,N,N',N'-tetramethyl-N,N'-bis(tetradecyl)-p-xylene-$\alpha,\alpha'$-diammonium dichloride; N,N,-N',N'-tetramethyl-N,N'-dioctadecyl-p-xylene-$\alpha,\alpha'$-diammonium dichloride; N,N,N',N'-tetramethyl-N,N'dioctadecyl-1,2-ethyldiammonium dibromide; N,-N'-dimethyl-N,N,N',N'-tetraheptadecyl-2-butene-1,4-diammonium chloride; and N,N,N',N'-tetramethyl-N,N'-dioctadecyl-x-dodecyl-y-xylene-$\alpha,\alpha'$-diammonium dichloride.

Organic quaternary salts as described above are essentially disclosed in British Pat. No. 1,227,144. The organic quaternary salts may be used in the reaction in an amount of about 0.01 weight percent to about 20 weight percent based on the 1-olefin, preferably from 0.01 weight percent to about 5 weight percent.

The reaction may be generally carried out by charging the 1-olefin and free radical initiator, if peroxides or azo compounds are employed, to a reaction vessel along with the organic quaternary salts. Inert organic diluents may be employed if desired but are not necessary. Examples of such diluents include benzene, carbon tetrachloride, straight chain paraffin hydrocarbons such as pentane, heptane and the like. It is essential that the system be anhydrous. Hydrogen bromide (anhydrous) is then slowly introduced to the mixture in the reaction vessel and the exothermic reaction enthused. Sufficient cooling should be provided so as to maintain the reaction temperature in a range from about O:C up to about 200° C, preferably between about 25° to about 100° C. The total amount of hydrogen bromide added to the reaction will obviously vary depending upon the extent of reaction desired and forms no essential part of this invention since, irrespective of the extent of reaction that may take place, the selectivity in producing the 1-bromoalkane product will be improved. To obtain substantially complete reaction of the 1-olefin, it is preferred that a slight molar excess of hydrogen bromide be employed; that is, a slight excess of one mol of hydrogen bromide per mole of 1-olefin. Since the reaction is highly efficient, greater quantities of bromide are usually not necessary. After the reaction has been completed, as indicated by a decrease in the exothermic heat generated, the reaction mixture will be cooled and the product recovered according to conventional techniques.

The following examples will serve to further illustrate the invention and the improved selectivity in producing 1-bromoalkanes.

EXAMPLE 1

In accordance with the process of this invention, 33.6 g. (0.3 mol) of 1-octene, 0.1 g benzoyl peroxide, 0.1 g octadecyltributylphosphonium bromide and 200 ml dry heptane were charged to a 500 ml, 3-necked flask and cooled to about 10° C. The flask was equipped with a reflux condenser, thermometer and gas inlet tube which was connected to a hydrogen bromide cylinder through a flow meter.

Anhydrous hydrogen bromide was then added to the flask through the flow meter at a rate of about 200 ml per minute while continuously stirring and cooling the reaction mixture for about 1 ½ hours. The resulting reaction product was then washed with about 10 percent sodium carbonate to remove any unreacted hydrogen bromide and dryed over anhydrous sodium sulfate. The reaction product was then analyzed by gas chromatography to determine the bromooctane content thereof in terms of 1-bromooctane and 2-bromooctane. The results of the analysis are indicated in the table hereinafter.

EXAMPLE 2

For comparison, the reaction described in Example 1 was repeated except that the organic quaternary salts, tri-n-butyloctadecylphosphonium bromide, was omitted. After work-up the reaction product was analyzed by gas chromatography to determine the content of 1-bromooctane and 2-bromooctane. The results of the analysis are indicated in the following table.

TABLE

Reaction Product Content (wt%)

| Example | 1-Bromooctane | 2-Bromooctane |
|---|---|---|
| 1 | >99 | Trace |
| 2 | 95.46 | 4.54 |

As indicated in the above table, a substantial increase in the selectivity to produce the 1-bromoalkane is obtained in the free radical addition of hydrogen bromide to 1-olefins.

EXAMPLE 3

Similar results are also obtained using propylene as the 1-olefin and hexadecyltrihexylammonium bromide as the organic quaternary salt following the procedure as outlined in Example 1.

EXAMPLE 4

Following the procedure as outlined in Example 1, similar results may be obtained by substituting for the 1-octene any of the following 1-olefins or mixtures thereof; 1-hexene, 1-dodecene, 1-tetradecene, 1-hexadecene, 1-icosene, $C_{24}$ 1-olefin, $C_{28}$ 1-olefin, and $C_{30}$ 1-olefin.

EXAMPLE 5

Further following the procedure outlined in Example 1, similar results may be obtained by substituting any of the following organic quaternary salts for the tri-n-butyloctadecylphosphonium bromide; trioctylethylammonium bromide, didodecyldimethylammonium chloride, tetrahexylammonium iodide, triphenyldecylphosphonium iodide, tribenzyldecylarsonium chloride, tricaprylylmethylammonium chloride, N,N,N',N'-tetramethyl-N,N'-dis(tetradecyl)-para-xylene-α,α'-diammonium dichloride, and N,N,N',N'-tetramethyl-N,N'-dioctadecyl-1,2-ethyl-diammonium dibromide.

Thus, having described the invention in detail, it will be understood by those skilled in the art that certain variations and modifications may be made without departing from the spirit and scope of the invention as described herein and in the appended claims.

I claim:

1. A process for producing 1-bromoalkanes comprising reacting a 1-olefin having 3 to 40 carbon atoms with anhydrous hydrogen bromide in the presence of a free radical initiator and an organic quaternary salt defined by the formula $$(R_1R_2R_3R_4M)^+X^-$$

wherein M is a pentavalent ion of nitrogen, arsenic, or phosphorus; X is a halide ion; and $R_1$, $R_2$, $R_3$ and $R_4$ are monovalent hydrocarbon radicals having a total sum of 12 to 70 carbon atoms, one of which may be further substituted by a quaternary group so that the salt is represented by the formula

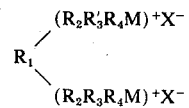

2. A process according to claim 1 wherein $R_1$, $R_2$, $R_3$ and $R_4$ have a total sum of carbon atoms in the range of about 18 to about 40.

3. A process according to claim 1 wherein a mixture of 1-olefins are employed.

4. A process according to claim 1 wherein a mixture of organic quaternary salts are employed.

5. A process according to claim 1 wherein the organic quaternary salt is octadecyltributylphosphonium bromide; trioctylethylammonium bromide; didodecyldimethylammonium chloride; tetrahexylammonium iodide; triphenyldecylphosphonium iodide; tribenzyldecylarsonium chloride; tricaprylylmethylammonium chloride; N,N,N',N'-tetramethyl-N,N'-bis(tetradecyl)-para-xylene-α,α'-di-ammonium dichloride; or N,N,N',N'-tetramethyl-N,N'-dioctadecyl-1,2-ethyl-diammonium dibromide.

* * * * *